(12) United States Patent
Balin et al.

(10) Patent No.: US 9,630,530 B2
(45) Date of Patent: Apr. 25, 2017

(54) LONGITUDINAL ADJUSTER FOR A VEHICLE SEAT

(71) Applicant: Johnson Controls Technology Company, Holland, MI (US)

(72) Inventors: Alexander I Balin, Ann Arbor, MI (US); Kurt Seibold, Whitmore Lake, MI (US); Ingo Kienke, Wermelskirchen (DE); Jorg Linnenbrink, Wuppertal (DE)

(73) Assignee: Johnson Controls Technology Company, Holland, MI (US)

( * ) Notice: Subject to any disclaimer, the term of this patent is extended or adjusted under 35 U.S.C. 154(b) by 42 days.

(21) Appl. No.: 14/399,015

(22) PCT Filed: May 7, 2013

(86) PCT No.: PCT/US2013/039861
§ 371 (c)(1),
(2) Date: Nov. 5, 2014

(87) PCT Pub. No.: WO2013/169719
PCT Pub. Date: Nov. 14, 2013

(65) Prior Publication Data
US 2015/0102199 A1 Apr. 16, 2015

Related U.S. Application Data

(60) Provisional application No. 61/643,587, filed on May 7, 2012.

(51) Int. Cl.
*F16M 13/00* (2006.01)
*B60N 2/235* (2006.01)
(Continued)

(52) U.S. Cl.
CPC ............... *B60N 2/235* (2013.01); *B60N 2/07* (2013.01); *B60N 2/0715* (2013.01);
(Continued)

(58) Field of Classification Search
CPC ..... B60N 2/067; B60N 2/0705; B60N 2/0715
(Continued)

(56) References Cited

U.S. PATENT DOCUMENTS 3,220,767 A 11/1965 Hendrickson
3,695,696 A 10/1972 Lohr et al.
(Continued)

FOREIGN PATENT DOCUMENTS

DE 893854 C 10/1953
DE 2152104 A1 4/1973
(Continued)

OTHER PUBLICATIONS

International Preliminary Report on Patentability for Application No. PCT/US2013/039861; dated Nov. 20, 2014.
(Continued)

*Primary Examiner* — Todd M Epps
(74) *Attorney, Agent, or Firm* — The Dobrusin Law Firm, P.C.

(57) ABSTRACT

Longitudinal, adjuster (27) having an outer and an Inner rail (50, 51), characterized in that the outer rail (50) has a structural element (53) which absorbs vertical forces and has a flexible element which biases a rolling body (52) against the inner rail (51).

8 Claims, 4 Drawing Sheets

Figure 3:
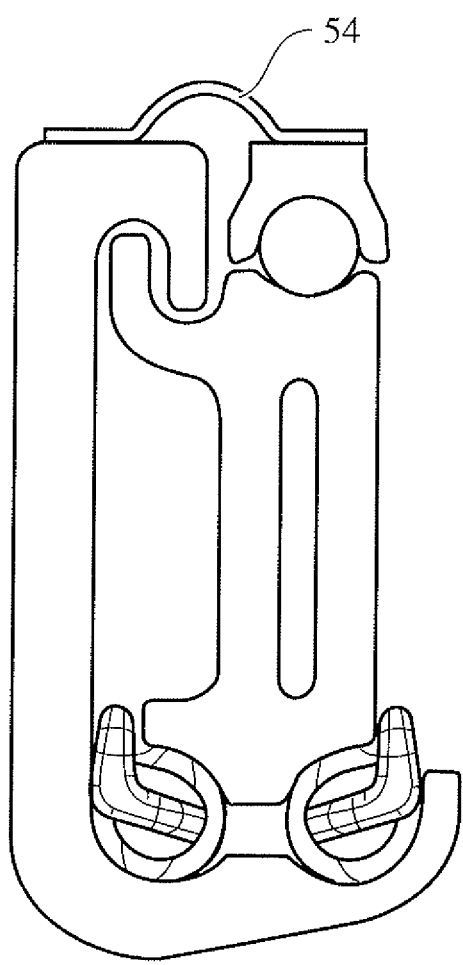

(51) Int. Cl.

| | | |
|---|---|---|
| *B60N 2/22* | (2006.01) | |
| *B60N 2/68* | (2006.01) | |
| *B60N 2/07* | (2006.01) | |
| *B60N 2/16* | (2006.01) | |
| *B60N 2/18* | (2006.01) | |
| *B60N 2/427* | (2006.01) | |
| *B60N 2/66* | (2006.01) | |
| *B60N 2/08* | (2006.01) | |
| *B60N 2/20* | (2006.01) | |

(52) U.S. Cl.
CPC ............ *B60N 2/0722* (2013.01); *B60N 2/08* (2013.01); *B60N 2/161* (2013.01); *B60N 2/1615* (2013.01); *B60N 2/1814* (2013.01); *B60N 2/20* (2013.01); *B60N 2/22* (2013.01); *B60N 2/427* (2013.01); *B60N 2/66* (2013.01); *B60N 2/68* (2013.01); *B60N 2/686* (2013.01); *B60N 2205/20* (2013.01)

(58) Field of Classification Search
USPC ........... 248/424, 429, 430; 296/65.06, 65.07, 296/65.08; 297/344.1
See application file for complete search history.

(56) References Cited

U.S. PATENT DOCUMENTS

| | | | |
|---|---|---|---|
| 3,759,587 A | 9/1973 | Christin | |
| 3,874,727 A | 4/1975 | Mehnert et al. | |
| 3,877,750 A | 4/1975 | Scholpp | |
| 4,379,589 A | 4/1983 | Marino | |
| 4,451,085 A | 5/1984 | Franck et al. | |
| 4,502,730 A | 3/1985 | Kazaoka et al. | |
| 4,585,272 A | 4/1986 | Ballarini | |
| 4,647,109 A | 3/1987 | Christophersen et al. | |
| 4,913,493 A | 4/1990 | Heidmann | |
| 4,995,669 A | 2/1991 | Croft | |
| 5,067,772 A | 11/1991 | Koa | |
| 5,154,476 A | 10/1992 | Haider et al. | |
| 5,163,735 A | 11/1992 | Aljundi | |
| 5,251,864 A | 10/1993 | Itou | |
| 5,320,410 A | 6/1994 | Faiks et al. | |
| 5,346,281 A | 9/1994 | Hughes | |
| 5,433,507 A | 7/1995 | Chang | |
| 5,466,048 A | 11/1995 | Fowler et al. | |
| 5,468,048 A | 11/1995 | Clemens et al. | |
| 5,577,811 A | 11/1996 | Ogg | |
| 5,651,583 A | 7/1997 | Klingler et al. | |
| 5,704,691 A | 1/1998 | Olson | |
| 5,733,008 A | 3/1998 | Tame | |
| 5,934,753 A | 8/1999 | Lange | |
| 5,984,407 A | 11/1999 | Ligon, Sr. et al. | |
| 6,022,075 A | 2/2000 | Blocker et al. | |
| 6,193,318 B1 | 2/2001 | Becker et al. | |
| 6,341,819 B1 | 1/2002 | Kojima et al. | |
| 6,422,651 B1 | 7/2002 | Mühlberger et al. | |
| 6,520,581 B1 | 2/2003 | Tame | |
| 6,565,156 B1 | 5/2003 | Yamashita et al. | |
| 6,592,186 B1 | 7/2003 | Mühlberger et al. | |
| 6,609,753 B2 | 8/2003 | Schmidt-Schaeffer | |
| 6,935,693 B2 | 8/2005 | Janscha et al. | |
| 6,955,399 B2 | 10/2005 | Hong | |
| 7,278,686 B2 | 10/2007 | Yoshida | |
| 7,740,316 B2 | 6/2010 | Beneker et al. | |
| 7,837,273 B1 | 11/2010 | Ratza et al. | |
| 7,926,879 B2 | 4/2011 | Schmitz et al. | |
| 7,959,229 B2 | 6/2011 | Ishijima et al. | |
| 8,162,404 B2 | 4/2012 | Ueda | |
| 8,333,530 B2 | 12/2012 | Omori | |
| 8,376,456 B2 * | 2/2013 | Fujita .................... B32B 7/12 297/216.1 | |
| 8,480,152 B2 | 7/2013 | Shimizu | |
| 2002/0060487 A1 | 5/2002 | Makosa | |
| 2002/0089225 A1 | 7/2002 | Bruck et al. | |
| 2003/0006636 A1 | 1/2003 | Ligon, Sr. et al. | |
| 2003/0218368 A1 | 11/2003 | Akaike et al. | |
| 2004/0160099 A1 | 8/2004 | Hong | |
| 2005/0062326 A1 | 3/2005 | Kim et al. | |
| 2005/0179290 A1 | 8/2005 | Hancock et al. | |
| 2005/0285008 A1* | 12/2005 | Beneker .............. B60N 2/0705 248/430 | |
| 2006/0055219 A1 | 3/2006 | Heimann et al. | |
| 2006/0152051 A1 | 7/2006 | Colja et al. | |
| 2006/0226683 A1 | 10/2006 | Massara et al. | |
| 2006/0244293 A1 | 11/2006 | Buffa | |
| 2007/0090263 A1* | 4/2007 | Yamada ............... B60N 2/0705 248/429 | |
| 2007/0108816 A1 | 5/2007 | McQueen et al. | |
| 2009/0026811 A1 | 1/2009 | Samain et al. | |
| 2009/0096263 A1 | 4/2009 | Samain et al. | |
| 2009/0174241 A1 | 7/2009 | Pattyn et al. | |
| 2009/0288270 A1 | 11/2009 | Yamashita | |
| 2010/0026069 A1 | 2/2010 | Bruck et al. | |
| 2010/0026070 A1 | 2/2010 | Rohee et al. | |
| 2010/0096897 A1 | 4/2010 | Kienke et al. | |
| 2010/0117419 A1 | 5/2010 | Schmitz et al. | |
| 2010/0133732 A1 | 6/2010 | Yamaguchi et al. | |
| 2010/0201173 A1* | 8/2010 | Boes .................... B60N 2/0705 297/344.1 | |
| 2011/0006581 A1 | 1/2011 | Funk et al. | |
| 2011/0042514 A1 | 2/2011 | Ehlers et al. | |
| 2011/0042515 A1 | 2/2011 | Schoke et al. | |
| 2011/0115268 A1 | 5/2011 | Maierhofer et al. | |
| 2011/0127817 A1 | 6/2011 | Yu et al. | |
| 2011/0304188 A1 | 12/2011 | Aktas | |
| 2011/0316317 A1 | 12/2011 | Sprenger et al. | |
| 2012/0133183 A1 | 5/2012 | Kim et al. | |
| 2012/0228911 A1 | 9/2012 | Piretti | |
| 2013/0075571 A1* | 3/2013 | Suck ..................... B60N 2/072 248/430 | |
| 2013/0248675 A1* | 9/2013 | Ewald ................. B60N 2/0705 248/430 | |
| 2013/0313876 A1 | 11/2013 | Perrin | |
| 2013/0341982 A1 | 12/2013 | Maierhofer et al. | |
| 2014/0138996 A1 | 5/2014 | Kramm et al. | |
| 2015/0102199 A1 | 4/2015 | Balin et al. | |
| 2015/0108805 A1 | 4/2015 | Linnenbrink et al. | |
| 2015/0151653 A1 | 6/2015 | Furuta | |
| 2015/0203011 A1 | 7/2015 | Fujita et al. | |
| 2015/0314709 A1 | 11/2015 | Kim et al. | |

FOREIGN PATENT DOCUMENTS

| | | |
|---|---|---|
| DE | 2723722 A1 | 12/1978 |
| DE | 3937818 A1 | 5/1991 |
| DE | 19639109 A1 | 3/1998 |
| DE | 19961070 C1 | 4/2001 |
| DE | 202006007862 U1 | 9/2007 |
| DE | 102008039166 A1 | 2/2010 |
| DE | 102009043298 A1 | 5/2011 |
| DE | 102011106219 A1 | 1/2012 |
| EP | 0842807 A1 | 5/1998 |
| FR | 703111 A | 4/1931 |
| FR | 2718398 A1 | 10/1995 |
| FR | 2889120 A1 | 2/2007 |
| JP | S5735648 B2 | 7/1982 |
| JP | S57143930 | 9/1982 |
| JP | S59177009 A | 10/1984 |
| JP | S608121 A | 1/1985 |
| JP | S60160911 U | 10/1985 |
| JP | S616038 A | 1/1986 |
| JP | S6275735 U | 5/1987 |
| JP | S6328043 U | 2/1988 |
| JP | H04189635 A | 7/1992 |
| JP | H04115448 U | 10/1992 |
| JP | H07205690 A | 8/1995 |
| JP | 2001105949 A | 4/2001 |
| JP | 2003341393 A | 12/2003 |
| JP | 2005289187 A | 10/2005 |
| JP | 2009154821 A | 7/2009 |
| KR | 2019970008834 A | 3/1997 |
| KR | 1020030064150 A | 7/2003 |

(56) References Cited

FOREIGN PATENT DOCUMENTS

| | | |
|---|---|---|
| KR | 1020100049059 A | 5/2010 |
| WO | 93/25404 A1 | 12/1993 |
| WO | 94/07393 A1 | 4/1994 |
| WO | 9501888 A1 | 1/1995 |
| WO | 9720706 A1 | 6/1997 |
| WO | 03/068557 A1 | 8/2003 |
| WO | 2012009515 A1 | 1/2012 |
| WO | 2013/167975 A2 | 11/2013 |
| WO | 2013/169714 A1 | 11/2013 |
| WO | 2013/169715 A1 | 11/2013 |
| WO | 2013/169717 A1 | 11/2013 |
| WO | 2013/169718 A1 | 11/2013 |
| WO | 2013/169719 A1 | 11/2013 |
| WO | 2013/169720 A1 | 11/2013 |

OTHER PUBLICATIONS

International Search Report and Written Opinion for Application No. PCT/US2013/039861, dated Oct. 4, 2013.
Office Action for U.S. Appl. No. 14/399,007 dated Oct. 27, 2015.
Office Action for U.S. Appl. No. 14/398,498, dated Sep. 24, 2015.
Office Action for U.S. Appl. No. 14/398,577, dated Sep. 22, 2015.
Office Action for U.S. Appl. No. 14/399,038 dated Mar. 1, 2016.
Office Action for U.S. Appl. No. 14/399,007 dated Apr. 29, 2016.
Office Action for U.S. Appl. No. 14/398,820 dated May 13, 2016.
Office Action for U.S. Appl. No. 14/398,498 dated Jun. 6, 2016.
Office Action for U.S. Appl. No. 14/398,768 dated Jun. 9, 2016.
Office Action for U.S. Appl. No. 14/398,498 dated Sep. 29, 2016.

\* cited by examiner

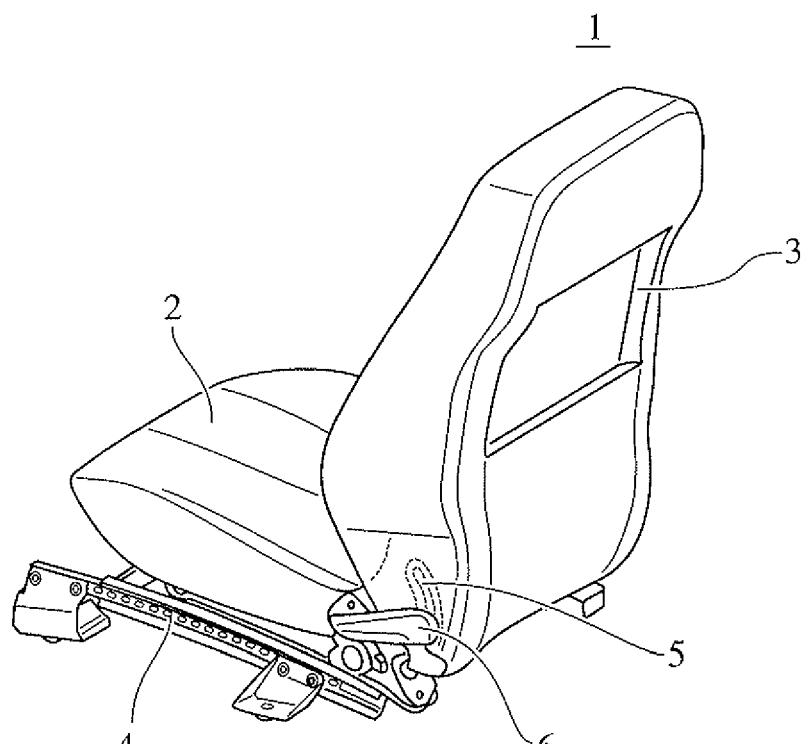
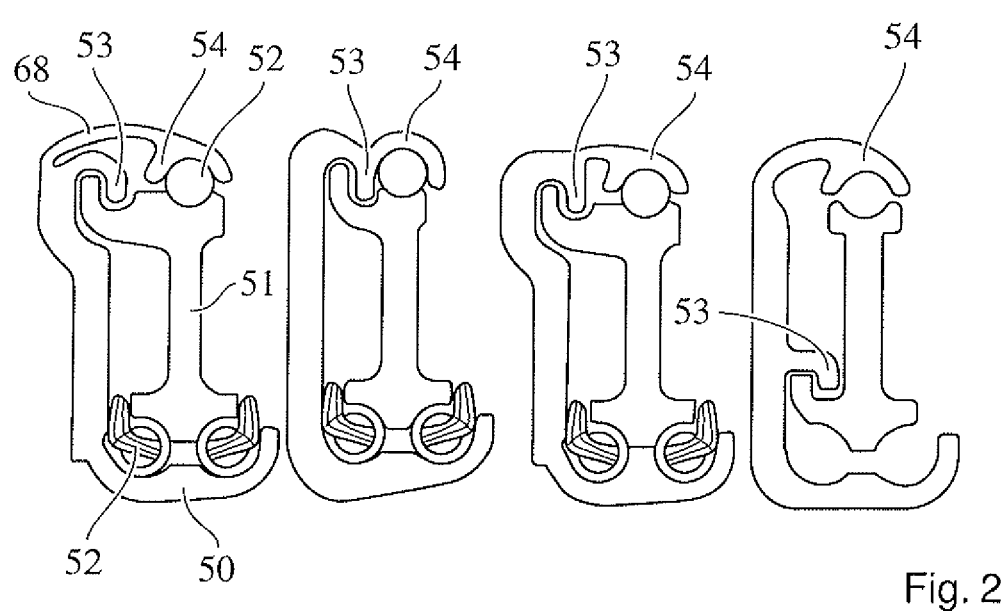
Fig. 1
Fig. 2

LONGITUDINAL ADJUSTER FOR A VEHICLE SEAT

CLAIM OF PRIORITY

This application claims priority to U.S. application Ser. No. 61/643,587, filed May 7, 2012, the entire contents thereof are incorporated herein by reference.

The present invention relates to a longitudinal adjuster tor a vehicle seat having an outer, an inner rail and a flexible member.

Automotive seat track assemblies must meet many requirements, including stability, strength, free play and slide effort. In addition, designs for these assemblies must be robust, insensitive to manufacturing tolerances (or dimensional variation) associated with the subassemblies and components. Many automotive seat track designs use steel rails. One rail is fixed to the vehicle floor, while the other is fixed to the upper portion of the seat. Rolling or sliding media are used to enable smooth relative motion between the two rails when they are not looked as by a latch.

A goal of the invention is to provide automotive seat track assemblies that are lower in mass than typical seat track assemblies. In order to reduce mass, materials other than steel may be used for the rails, but inventive steps are required in order to use lighter materials and still meet the requirements.

Most commercially available tracks rely of the stiffness of the rails to provide strength and stability to the assembly, while controlling free play. Stiffer rails result in stronger, more stable track assemblies with less free play. However, stiffer rails result in negative impacts to slide effort and make the assembly process more sensitive to dimensional variation. Therefore, many designs must carefully select the stiffness so as not to be too stiff for one requirement, or not stiff enough for another requirement.

This tradeoff is no longer feasible when selected materials of lower density and lower Young modulus are used for the rails, such as aluminum or fiber reinforced plastic.

The invention effectively decouples free pay and slide effort from stability and strength while resulting in improved insensitivity to component and subassembly dimensional variation through the use of a flexible member.

The object is achieved according to the invention by way of a longitudinal adjuster having an outer and an inner rail, wherein the outer rail has a structural element which absorbs vertical forces and has a flexible element which biases a rolling body against the inner rail.

The disclosure made for this subject of the present invention applies in equal measure to the other subjects of the present invention, and vice versa.

The present invention relates to a longitudinal adjuster for a vehicle seat, which is utilized to adjust the position of the vehicle seat according to the length of the seat occupant. According to the invention, the longitudinal adjuster comprises an outer and an inner rail, wherein preferably rolling bodies are arranged between the two rains. Conventionally, one of the rails, preferably the inner rail, is fixed to the vehicle seat and one rail, preferably the outer rail is attached to the body of the car. The outer rail preferably surrounds the inner rail at least partially. Normally, there are two longitudinal seat adjusters per vehicle seat or per vehicle bench.

According to the present invention, the longitudinal adjuster comprises a structural element, which, according to the present invention, is not flexible, does not deform during assembly of the longitudinal adjuster and is designed to absorb a vertical- and or horizontal load. The structural element is preferably provided at the outer rail, which is more preferably connected to the vehicle body. The structural element can be made of a particularly stiff material and/or can be a hardened material.

In a preferred embodiment, the structural element provides a surface for the rolling bodies.

Furthermore, the longitudinal adjuster comprises a flexible element, which deflects elastically during production of the longitudinal adjuster. Preferably, the flexible element is provided integrally with the outer rail and/or as a separate component. The flexible element can be produced from the same material as or a different material from the outer rail.

Preferably, the inner rail is realized in a comparatively rigid manner, i.e. does not comprise a flexible element.

Preferably, the outer and/or inner rail is produced from a lightweight material, in particular aluminium, plastic, fiber reinforced plastic and/or plastic composite materials or the like.

A further preferred or inventive subject matter of the present invention is a longitudinal adjuster of a vehicle seat having an outer and an inner rail and a rolling-/sliding-body-cage which is made out of flexible material (for example spring steel) and which is arranged between the inner- and the outer rail and is formed in a resilient/flexible manner.

The disclosure made for this subject of the present invention applies in equal measure to the other subjects of the present invention, and vice versa.

Preferably, the rolling-/sliding-body-cage comprises slider elements, which comprise a relatively low friction factor.

Preferably, the rolling-/sliding-body-cage is elastically deformed during assembly, particularly during its assembly between the two rails.

Preferably, the rolling/sliding body cage is formed in a resilient/flexible manner in two spatial directions, for example in a horizontal direction and in a vertical direction.

In a preferred embodiment, the rolling-/sliding-body-cage is fixed to one of the rails, preferably the inner rail.

In a preferred embodiment, the inner rail comprises indentations and corresponding convexities, particularly at its upper end and preferably prodived equidistantly. In a preferred embodiment, the rolling-/sliding-body-cage is provided at the upper end of the inner rail and more preferably around and/or ontop of the convexities. Preferably, the rolling-/sliding-body-cage at least partially winds around a vertical surface of each convexity.

Yet a further preferred or inventive subject matter of the present invention is a longitudinal adjuster having an outer and an inner rail and a rolling- and/or sliding-body-cage which is arranged between the inner and the outer rail and is connected to the inner rail in a special manner, such as, one end of the rolling/sliding body cage is fixed to the inner rail, preferably such that there is zero degrees of freedom of movement relative to inner rail, and another end is free to move. After outer rail introduced to inner rail, the other end of the rolling and/or sliding body cage should be fixed. This configuration allows the deformation of the rolling-/sliding-body-cage during the assembly.

The disclosure made for this subject of the present invention applies in equal measure to the other subjects of the present invention, and vice versa.

Preferably or according to the invention, the longitudinal adjuster has a rolling- and/or sliding-body-cage which is arranged between the inner and the outer rail, wherein the longitudinal adjuster has a lock which prevents the rolling- and/or sliding body-cage from moving particularly relative to the inner rail.

The disclosure made for this subject of the present invention applies in equal ea sure to the other subjects of the present invention, and vice versa.

Preferably, the one or more, preferable two rolling- and/or sliding-body-cages are connected to the inner rail. Each has one end free to move and another connected, preferably firmly to inner rail. The fixed end of one of the spring cage preferably located at the front of the rail and another spring cage has a fixed end preferably on the rear of the rail. Free ends of the both spring cages located toward middle of the rail, but more preferably, do not touch. Also, the inventive rail has locking element, which can lock/fix (prevent movement) of the free end(s) of each rolling and/or slideing body cage. This locking element is preferably synchronized with the main latching device (which handles the structural load and prevents the inner rail from moving relative to outer rail). Which means, when the longitudinal adjuster requires an adjustment, the main latch is released so that the two rails can move relative to each other and one end of each rolling- and/or sliding-body-cage locking element is released as well, which means ends of the rolling-/sliding-body-cages are again free and as a result of it, the sliding effort is low, which allows to adjust the longitudinal adjuster with low siding effort. As soon, as required adjustment is completed, then the main latch and one end of each rolling- and/or sliding-body-cage locking element return to its locking mode, which prevents the movement of the both ends of the rolling- and/or sliding-body-cages and provides required system rigidity and prevent relative movement between inner and outer rails.

The inventions are explained in the following text on the basis of FIGS. 1-6. These explanations are merely by way of example and do not limit the general concept of the invention.

In the figures:

FIG. 1 shows a vehicle seat.

FIGS. 2-5 schematically show the longitudinal adjuster according to the invention.

FIG. 1 schematically shows a perspective illustration of a vehicle seat 1. The vehicle seat 1 is in the form of a conventional vehicle seat and comprises at least a seat part 2 and a backrest 3. Furthermore, the vehicle seat 1 has a conventional longitudinal adjuster 4, by means of which the vehicle seat 1 is coupled to a bodywork structure of a vehicle (not illustrated).

FIGS. 2 and 3 show the cross-section of a longitudinal adjuster having an outer rail 50 and an inner rail 51. Rolling bodies 52 are arranged between the rails 50, 51, in each case in the upper and lower region. According to the invention, the outer rail 50 has a structural element 53 which interacts with a structural element, which is arranged preferably integrally on the inner rail, and as a result absorbs vertical and/or lateral forces. The structural element 53 has a high rigidity and does not deform during the assembly of the inner- and outer rail. Preferably, the structural element 53 provides a contact surface for the rolling bodies. Furthermore, according to the invention, the outer rail has an elastic region 54 which interacts with the rolling bodies 52, in particular the rolling bodies arranged in the upper region of the rail according to the invention, and biases them against the inner rail 51. Preferably, the elastic element deforms elastically during the assembly of the inner- and the outer rail. In the embodiment according to FIG. 2, the elastic regions 54 are provided in each case integrally with the outer rail 50, it can be seen that the structural element 53 an be provided in different regions of the outer rail. Preferably, the elastic region 54 comprises an area 68 with reduces material thickness and or an arm like region 68, which deforms at comparatively little forces. Preferably, the outer and the inner rail are produced in each case from a lightweight material, in particular aluminium, plastic, fiber reinforced plastic and/or plastic composite materials or the like, preferably as an extruded component.

In the exemplary embodiment according to FIG. 3, reference can be made essentially to the statements as per FIG. 2, although in the present case the elastic element 54 is not provided integrally with the outer rail. In the present case, the rail has an additional element 54 which biases the rolling bodies 52 against the inner rail.

Figure 4:
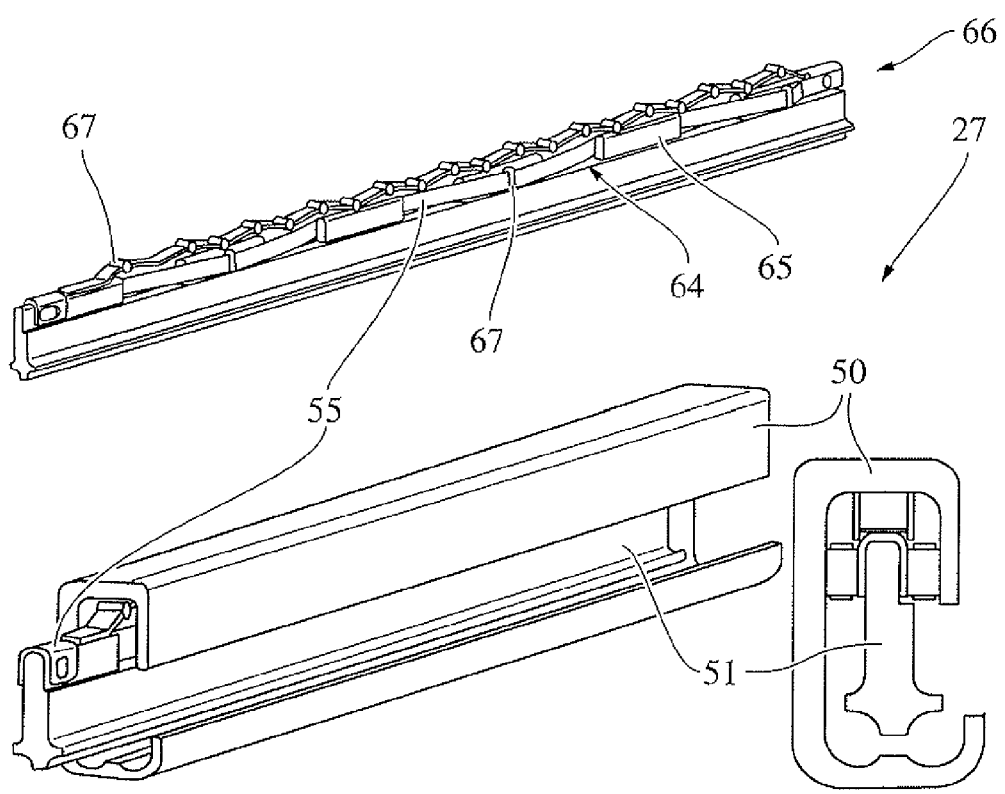

In the embodiment according to FIG. 4, a rolling and/or sliding body cage 55 is provided between the outer rail 50 and the inner rail 51 and is connected preferably to the inner rail, in particular in a displaceable manner, and is configured such that it biases the inner rail against the outer rail both in the vertical and in the horizontal direction. The rolling/sliding body cage (spring cage) made out of flexible material tor example spring steel) installed on the inner rail, one end is fixed and another is free to deflect. Having one end free allows to generate relatively low normal forces, which means low slide effort. After rails are assembled, then the other end should be fixed, which provide required rigidity for whole system and at the same time low sliding effort. Preferably, the cage comprises at least one region 67 with a reduced friction. Preferably, the inner rail comprises indetations 64. The cage is preferably fixed to the resulting convexities 65. Preferably, the cage 55 is designed to absorb forces in two directions, which are perpendicular to each other.

Figure 5A:
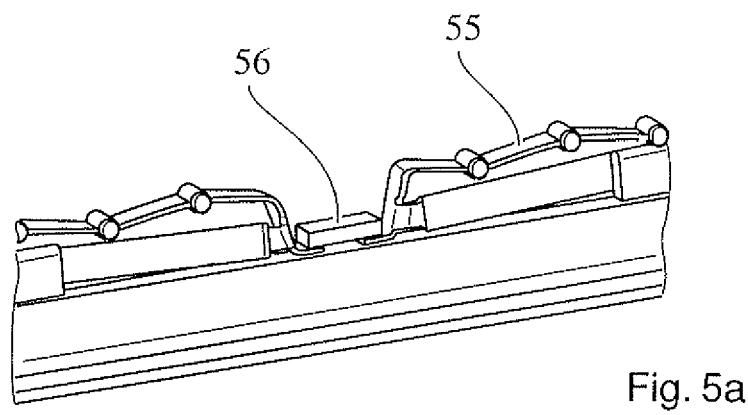
Figure 5B:
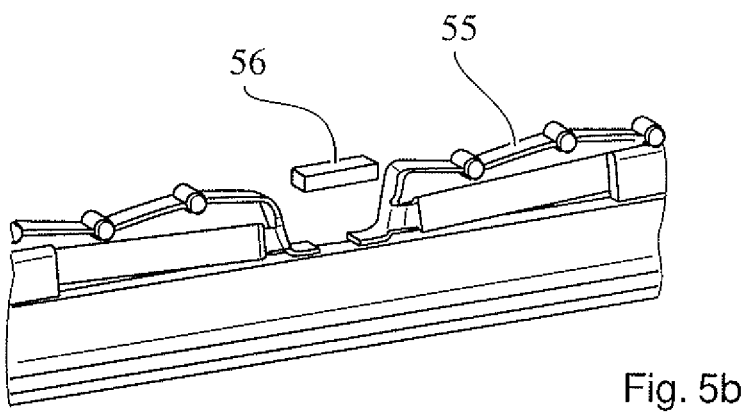

As can be seen particular from FIG. 5, the longitudinal adjuster according to the invention has preferably a locking element 56. FIG. 5a illustrates the locking element in its locking state. FIG. 5b shows the unlocked state of the locking element 56.

The inner rail is pre assembled, in the present case with two rolling and/or sliding body cages (spring cages) made out of flexible material, preferably spring steel. Each has one end free and another fixed to inner rail. The fixed end of one of the spring cage is, in the present case, located at the front of the rail and another spring cage has a fixed end on the rear of the rail. The free ends of the both spring cages are located toward the middle of the rail. Also, the rail has a locking element 56, which can lock/fix (prevent movement) of the free ends of both spring cages. This looking element is preferably synchronized with the main latching device (which handles the structural load and prevents the inner rail from moving relative to outer rail). Which means, when the longitudinal adjuster requires an adjustment, the main latch is released and preferably, each spring cage locking element is released as well, which means ends of the spring cages are again free and as function of it, the sliding effort is low, which allows to adjust the track with low sliding effort. As soon, as required adjustment completed, then the main latch and preferably the spring cage locking element return to locking mode, which provide required system rigidity and prevent relative movement between inner and outer rails.

LIST OF REFERENCE SIGNS

Vehicle seat
Seat part
Backrest
Longitudinal adjusting device
Inclination adjusting apparatus
Adjusting lever 27 Longitudinal adjustment rail
Deformation region
Outer rail
Inner rail
Rolling body
Structural element
Flexible element
Rolling body cage
Lock
Cable pull, Bowden cable
Guide
Height adjuster
Force transmission means
Lock of the two rails
Indentation 64
Convexity
Upper end of the inner rail
Low friction region
Reduced material thickness; arm-like area

The invention claimed is:

1. A longitudinal adjuster having an outer rail and an inner rail, wherein the outer rail has a structural element which is made of a stiff material and which absorbs vertical forces, wherein the outer rail has an elastic element which biases a rolling body against the inner rail, wherein the elastic element is provided as a separate component of the outer rail, wherein the inner rail is realized in a rigid manner, and wherein the outer rail and the inner rail are produced from plastic, fiber reinforced plastic, plastic composite materials, or a combination thereof.

2. The longitudinal adjuster according to claim 1, wherein the inner rail, the outer rail, or both the inner rail and the outer rail, is produced from a lightweight building material.

3. The longitudinal adjuster according to claim 1, including a rolling or sliding body cage which is comprised of flexible material and arranged in between the inner rail and the outer rail, wherein the rolling or sliding body cage is formed in a resilient manner.

4. The longitudinal adjuster according to claim 3, wherein the rolling or sliding body cage is connected to the inner rail, wherein one end of the rolling or sliding body cage has zero degrees of freedom relative to the inner rail, and wherein an other end of the rolling or sliding body cage has at least one degree of freedom.

5. The longitudinal adjuster according to claim 4, wherein the other end is reversibly fixed to the inner rail after assembly of the inner rail and the outer rail.

6. A longitudinal adjuster having an outer rail and an inner rail and at least one rolling or sliding body cage, wherein the at least one rolling or sliding body cage is made out of flexible material and arranged in between the inner rail and the outer rail, and wherein the longitudinal adjuster further includes a lock which prevents the at least one rolling or sliding body cage from moving relative to the inner rail.

7. The longitudinal adjuster according to claim 6, wherein the inner rail, the outer rail, or both the inner rail and the outer rail, is produced from aluminium, plastic, fiber reinforced plastic, plastic composite materials, or a combination thereof.

8. The longitudinal adjuster according to claim 6, which includes two or more rolling or sliding body cages.

* * * * *